Feb. 27, 1973 P. H. ANDERSON 3,718,778

PULSE TRAIN CHECKING CIRCUIT

Filed Dec. 23, 1971

2 Sheets-Sheet 1

Feb. 27, 1973 P. H. ANDERSON 3,718,778

PULSE TRAIN CHECKING CIRCUIT

Filed Dec. 23, 1971

2 Sheets-Sheet 2

United States Patent Office 3,718,778
Patented Feb. 27, 1973

3,718,778

PULSE TRAIN CHECKING CIRCUIT

Peter Harold Anderson, Howell Township, Monmouth County, N.J., assignor to Bell Telephone Laboratories, Incorporated, Murray Hill, N.J.

Filed Dec. 23, 1971, Ser. No. 211,236
Int. Cl. H04l 25/02; H04m 1/24
U.S. Cl. 179—175.2 A 15 Claims

ABSTRACT OF THE DISCLOSURE

An arrangement for checking that specified minima are met by the pulse, interpulse and pulse repetition periods of a pulse train, including first and second timing circuits normally operative during the interpulse and pulse periods respectively, for defining timing intervals corresponding to the respective minima specified therefor. Upon a satisfactory check of the interpulse period, the first timing circuit operates for a predetermined period corresponding to the difference between the specified repetition period minimum and the sum of the pulse and interpulse minima to inhibit the operation of the second timing circuit. The latter provides an output signal only if it "times out" before the pulse period has terminated, thereby indicating that all three minima have been met.

BACKGROUND OF THE INVENTION

My invention relates generally to pulse checking circuits. More specifically, it relates to an arrangement for checking that the pulse, interpulse and repetition periods in a pulse train exceed specified minima.

In many electronic systems, such as computers and communications equipment, information-bearing and/or control signals must meet specified criteria to prevent erroneous system operation. Typically, these criteria relate to such signal parameters as frequency, phase, amplitude or time duration.

The characteristics of telephone switching equipment, for example, require that incoming dial pulses and the periods between them, the latter being herein referred to as "interpulse periods," meet certain timing criteria. One of these criteria is the pulse repetition rate, that is, the rate at which the pulse or interpulse periods recur. While arrangements are known which check that the repetition rate of a train of pulses, such as dial pulses, falls within certain prescribed limits, these known arrangements generally measure the repetition rate as an average over the entire pulse train rather than on a pulse-by-pulse basis.

The latter approach is preferable in certain applications, for example, the checking and calibration of automatic multifrequency telephone dialers. Such dialers generate a train of multifrequency tone bursts (each of which may be regarded as a "pulse") to represent the digits of a telephone number. The characteristics of telephone equipment, to which these tone burst pulse trains are directed, are such that the time interval between the trailing edge of one pulse and that of the succeeding pulse, herein referred to as a "repetition period," must meet a specified minimum. Accordingly, it is desirable to check the repetition rate, or period, on a pulse-by-pulse basis rather than on the basis of an average as is done in the prior art.

A second timing criterion widely used in checking pulse trains is the so-called percent break, defined as the ratio of the interpulse, or break, period to the repetition period (the sum of the pulse and interpulse durations). In some applications, including the dialer checking application discussed above, it is desirable to check the pulse and interpulse periods directly on the basis of their individual time durations, rather than via an indirect measurement such as percent break.

SUMMARY OF THE INVENTION

Accordingly, it is a general object of the present invention to provide an improved pulse train checking circuit.

A more specific object of the invention is to provide a circuit which checks that the pulse train repetition period and the pulse and interpulse periods associated therewith exceed specified minima.

A further object of the invention is to provide a pulse train checking circuit which operates reliably over long periods of time and over a range of ambient temperatures and which is insensitive to fluctuations in power supply voltages.

In accordance with the invention, these and other objects are achieved in a pulse train checking circuit including first and second timing circuits operative during the interpulse and pulse periods of the pulse train, respectively, for defining timing intervals respectively corresponding to minima specified therefor. Upon a satisfactory check of an interpulse period, the first timing circuit times a predetermined interval, the duration of which corresponds to the difference between a minimum specified for the pulse train repetition period and the sum of the specified pulse and interpulse minima. This predetermined interval is herein referred to as the supplementary interval associated with the specified (pulse, interpulse and repetition period) minima. The first timing circuit inhibits operation of the second timing circuit for the duraton of the supplementary interval. The second timing circuit provides an output signal only if it "times out" prior to, or concurrent with, termination of the pulse following the previously checked interpulse period, thereby indicating that all three specified minima have been met.

In an illustrative embodiment of the invention the first and second timing circuits include circuitry for generating respective first and second timing signals, illustratively linear ramp voltages. The first timing signal ramp is comprised of first and second sequential segments, the second segment being initiated immediately upon completion of the first. The durations of the first and second segments respectively correspond to the specified interpulse minimum and the above-mentioned supplementary interval.

The first timing signal ramp is initiated at the start of each interpulse period. If, when the interpulse period terminates, the second segment has not yet been initiated, the first timing signal ramp is terminated. Initiation of the second segment before the interpulse period terminates indicates that the specified interpulse minimum has been met. In that case the first timing circuit generates the second segment to its completion, thereby timing the supplementary interval, notwithstanding termination of the interpulse period in the interim.

The second timing ramp is initiated in response to the completion of the second segment of the first timing ramp, or in response to the termination of the interpulse period (that is, the initiation of the following pulse period), whichever occurs later. The duration of the second timing ramp corresponds to the specified pulse period minimum. Thus, in accordance with the invention, termination of the pulse period subsequent to completion of the second timing ramp indicates that each of the three specified minima has been met.

In accordance with one aspect of the invention, one of the timing ramps may be postive going and the other negative going, and further, the magnitudes of the positive- and negative-going timing ramps may be independently adjusted, so that the initial value of each ramp may advantageously correspond to the final value of the other, notwithstanding their unequal durations.

In accordance with another aspect of the invention, the first and second timing circuits share a common integrator and a common reference signal, illustratively, the voltage across a forward-biased diode. The reference voltage is integrated by the integrator when the first timing circuit is operative, thereby generating the first timing ramp. The second timing circuit generates the second timing ramp by amplifying and inverting the reference voltage prior to integration, thereby generating a negative-going second timing ramp having a slope magnitude different from that of the first timing ramp.

In accordance with a further aspect of the invention, the pulse train checking circuitry also includes comparators for defining the initial and final timing ramp voltages, as well as an intermediate voltage which demarcates the two segments of the first timing ramp. The comparator reference, or comparison, voltages may be derived from fixed d.c. sources. However, since the abovementioned timing circuit reference voltage is derived from a biased diode, it is subject to variations due to change in ambient temperature, fluctuations in power supply voltages, etc. Thus, the slopes of the first and second timing ramps, and hence their time durations, may drift from the desired values relative to fixed comparison voltages. Advantageously, this proobleem is alleviated in accordance with another aspect of the invention by deriving the comparator comparison voltages from the timing circuit reference voltage.

In accordance with yet another aspect of the invention, the pulse checking circuit includes a logic circuit responsive to both the comparator outputs and a logic signal derived from the pulse train to be checked, for controlling the first and second timing circuits as described above.

BRIEF DESCRIPTION OF THE DRAWING

A clear understanding of the invention may be gained from a consideration of the following discussion and accompanying drawing in which.

DETAILED DESCRIPTION

Figures 1, 3:
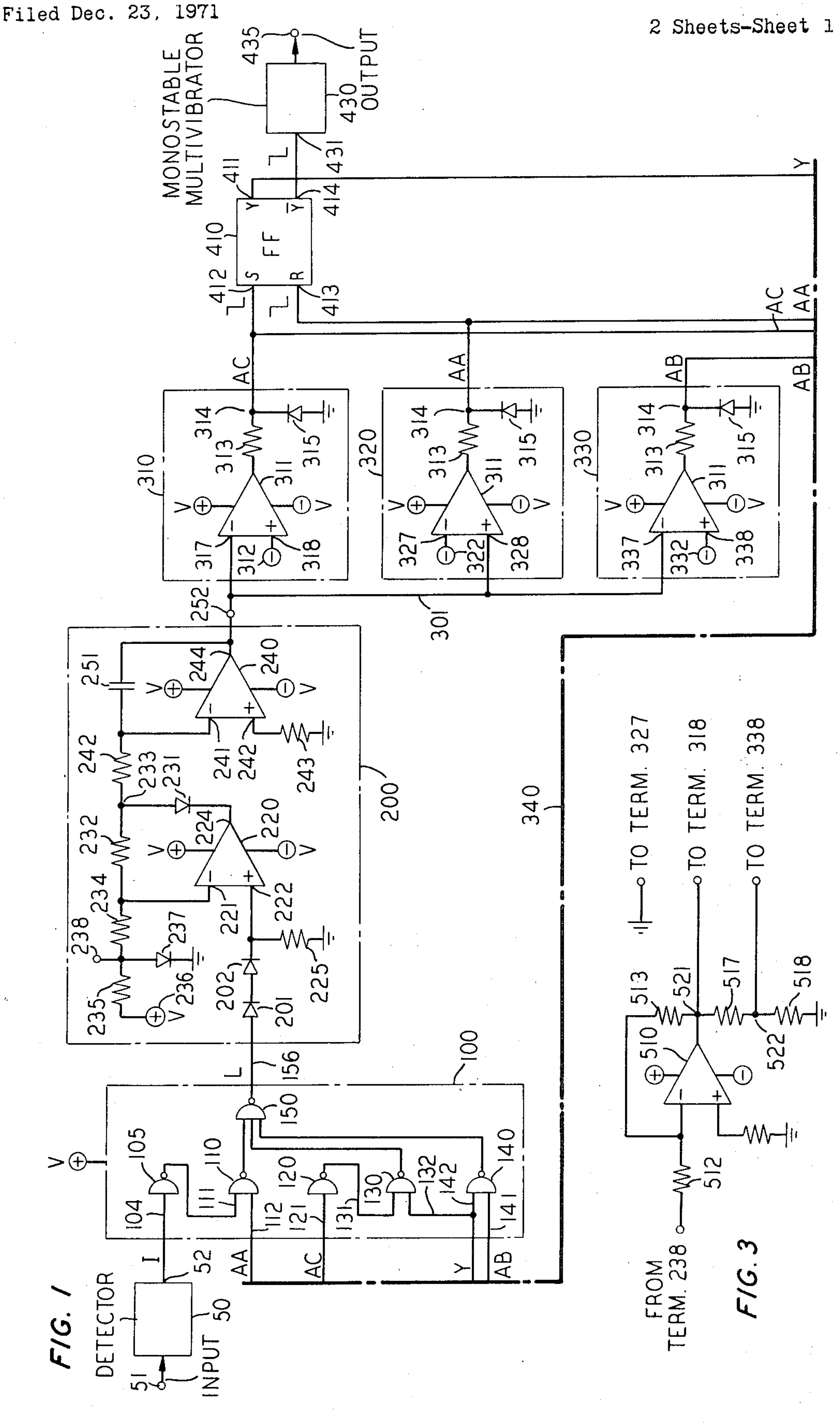
FIG. 1 is an illustrative embodiment of a pulse checking circuit in accordance with the invention.
FIG. 3 shows an arrangement adapted to provide comparison voltages for comparator circuitry utilized in the circuit of FIG. 1.

The pulse checking circuit shown in FIG. 1 comprises logic circuit 100, timing waveform generator 200, comparators 310, 320 and 330, bistable flip-flop 410 and monostable multivibrator 430. In accordance with the invention, the circuit in FIG. 1 checks a train of pulses applied at input terminal 51 to ensure that the pulse and interpulse periods and the repetition periods, respectively associated therewith, all exceed specified minima. A satisfactory check produces a predetermined signal at output terminal 435.

Logic circuit 100 includes NAND gates 110, 130 and 140, NOT gates 105 and 120 and NAND gate 150. The outputs of gates 105 and 120 are respectively connected to input leads 111 and 131 of gates 110 and 130. In addition, the output of gates 110, 130 and 140 are connected to the three input leads of gate 150. The output of gate 150, hereinafter referred to as "logic function L," is extended via lead 156 to timing waveform generator 200.

Logic circuit 100 is powered by a positive potential source of magnitude V and illustratively utilizes a positive logic system in which the logic values "0" and "1" are respectively represented by ground potential and a voltage substantially of magnitude V. Since input voltages for circuit 100 must conform to this logic system, detector 50 is provided as an interface between the pulse train to be checked and logic circuit 100. The pulse train is applied to input terminal 51 of detector 50. The latter provides at its output 52 a logical signal which has the value "1" during pulse periods and value "0" otherwise.

Illustratively, the pulse train to be checked may consist of alternate portions at first and second D.C. voltage levels (respectively corresponding to the pulse and interpulse periods). Detector 50 may then include well-known logic and level shifting circuitry to convert the first and second voltage levels to logic values "1" and "0," respectively. Alternatively, the pulse train may be comprised of a series of tone bursts such as those generated by automatic multifrequency telephone dialers. In that case, detector 50 may also comprise an A.C. to D.C. arrangement including, for example, rectifying and filtering circuits. Advantageously, any type of pulse train, i.e., any signal having alternate portions which are distinguishable on the basis of a detectable criterion, may be checked the circuit of FIG. 1 via implementation of appropriate interface circuitry in detector 50.

The output of detector 50, symbolically represented by I, is extended via lead 104 to gate 105 of logic circuit 100. Other inputs for circuit 100 are taken from cable 340 as described more fully hereinafter.

Timing waveform generator 200 comprises operational amplifiers 220 and 240. A feedback path including diode 231, point 233 and resistor 232 connects output terminal 224 of amplifier 220 to inverting input terminal 221 thereof. Terminal 221 is connected to ground via the serial combination of resistor 234 and diode 237, the anode of which is connected via resistor 235 to source of positive potential 236, which illustratively has magnitude V. In addition, noninverting input terminal 222 of amplifier 220 is connected to ground via resistor 225 and to lead 156 via diodes 201 and 202.

The configuration about amplifier 240 includes feedback capacitor 251 connecting output terminal 244 to inverting input terminal 241. The latter is connected to point 233 via input resistor 242. Resistor 243 connects noninverting input terminal 242 of amplifier 240 to ground.

Amplifiers 220 and 240 are each powered by a positive and a negative source of potential illustratively of magnitudes V and −V respectively.

The value of logic function L (the output signal of logic circuit 100 on lead 156) is either "0" or "1" illustratively represented, as noted above, by ground potential and a positive voltage substantially of magnitude V, respectively. When logic function L has the value "0," diodes 201 and 202 are nonconductive and ground potential is extended to noninverting input terminal 222 via resistor 225. Diode 237 is forward biased by current supplied thereto from source 236 via resistor 235. Its anode voltage is extended to inverting input terminal 221 via resistor 234. Hence, the forward voltage across diode 237 (typically 0.6–0.9 volt) is amplified and inverted by amplifier 220, the amplification factor being principally determined by resistors 232 and 234. Thus, a negative voltage is provided at point 233.

It will be recognized that amplifier 240 and its associated circuitry, including resistor 242 and capacitor 251, comprise a Miller integrator. Amplifier 240 inverts as well as integrates the voltage at point 233. Since as described above, the voltage at point 233 is negative when logic function L has the value "0," the signal at output terminal 252 of timing waveform generator 200 is a positive-going ramp in that instance.

When, on the other hand, logic function L has the value "1," a positive voltage substantially of magnitude V is extended to noninverting input terminal 222 via diodes 201 and 202. Accordingly, inverting input terminal 221 becomes substantially negative with respect thereto and the signal at output terminal 224 approaches magnitude V. Diode 231 is reverse biased and therefore, amplifier 220 is effectively nonoperative, the anode voltage of diode 237 being directly extended to point 233 via resistors 234 and 232. This positive voltage is extended via resistor 242 to inverting input terminal 241 of amplifier 240 thereby producing a negative-going ramp at output terminal 252 of timing waveform generator 200.

The slope magnitudes of both the positive- and negative-going ramp generated by timing waveform generator 200 are determined primarily by capacitor 251, resistor 242 and the voltage at point 233. In fact, because of the high degree of linearity of the Miller integrator, the slope magnitudes are linearly proportional to the voltage at point 233.

When the positive-going ramp is generated, the voltage at point 233 is determined by the voltage across diode 237 multiplied by the ratio of resistors 232 and 234, i.e., the gain of amplifier 220. When the negative-going ramp is generated, the voltage at point 233 is determined by the voltage across diode 237 multiplied by the ratio of resistor 242 to its sum with resistors 232 and 234. Thus, the slopes of the positive- and negative-going ramps provided by generator 200 may be adjusted by varying for example the ratio of resistors 232 and 234 for the positive slope and the sum of resistors 232 and 234 for the negative slope.

Comparators 310, 320 and 330 each comprise an operational amplifier 311, the output of which is extended to an output terminal 314 via a resistor 313. Amplifiers 311 in comparators 310, 320 and 330 respectively include inverting input terminals 317, 327 and 337 and noninverting input terminals 318, 328 and 338. Each operational amplifier is powered by a positive and a negative source of potential having respective magnitudes V and —V. Each amplifier 311 is operated at open loop gain. Accordingly, the output voltage of each of comparators 310, 320 and 330 is substantially of magnitude V (logic value "1") when the voltage at the inverting input terminal of its operational amplifier 311 is but slightly negative with respect to that at the noninverting terminal thereof. Similarly, when the voltage at the inverting input terminal of operational amplifier 311 is but slightly positive with respect to that at its noninverting terminal, the output thereof is substantially of magnitude —V. In that case, a diode 315, which is connected to each output terminal 314, becomes nonconductive and clamps terminal 314 to ground (logic value "0").

Comparators 310, 320 and 330 respectively include comparison sources 312, 322 and 332 respectively connected to terminals 318, 327 and 338. Although independent D.C. sources are shown in FIG. 1, sources 312, 322 and 332 may advantageously be derived from the anode voltage of diode 237 as described more fully hereinafter. The output signal of timing waveform generator 200 is extended via lead 301 to terminals 317, 328 and 337.

Thus, the output signals of comparators 310 and 330, symbolically represented by AC and AB respectively, have the logic value "1" when the output of timing waveform generator 200 is less than the value of their respective comparison sources 312 and 332 and have the logic value "0" when it is greater. The opposite relationship holds for comparator 320, the output signal thereof symbolically represented by AA, having logic value "1" when the output of timing waveform generator 200 is greater than the value of source 322 and logic value "0" when it is less.

The outputs of comparators 310, 320 and 330 are extended to logic circuit 100 via cable 340. Specifically, comparator output signals AA, AB and AC are respectively provided to leads 112, 141 and 121 of gates 110, 140 and 120. In addition, signals AC and AA are respectively extended to set and reset terminals 412 and 413 of flip-flop 410.

As symbolically indicated, flip-flop 410 is set in response to the change of signal AC from logic value "1" to logic value "0." Similarly, flip-flop 410 is reset in response to the change of signal AA from logic value "1" to logic value "0." The signal at output terminal 411 of flip-flop 410, symbolically represented by Y, has the logic value "1" when the flip-flop is set, and logic value "0" when it is reset. Signal Y is extended to logic circuit 100 via cable 340 and is provided at input leads 132 and 142 of gates 130 and 140, respectively.

Thus, logic function L (the output signal of logic circuit 100) is given by the expression $$L=\overline{[\overline{(\bar{I})(AA)}][\overline{(Y)(\overline{AC})}][\overline{(Y)(AB)}]}$$

which may be written in accordance with DeMorgan's Laws in the more convenient form $$L=(\bar{I})(AA)+(Y)(\overline{AC})+(Y)(AB)$$

That is, logic function L will have the value "0" unless both "ANDed" factors of at least one of the three "ORed" terms of the logic function have the logic value "1."

The inverse $\bar{Y}$ of signal Y is extended from output terminal 414 of flip-flop 410 to trigger input terminal 431 of monostable multivibrator 430. As indicated, the latter is triggered to provide an output pulse at terminal 435, in response to the change of flip-flop output signal $\bar{Y}$ from logic value "1" to logic value "0," i.e., in response to the transfer of flip-flop 410 from its reset to its set state.

Figure 2:
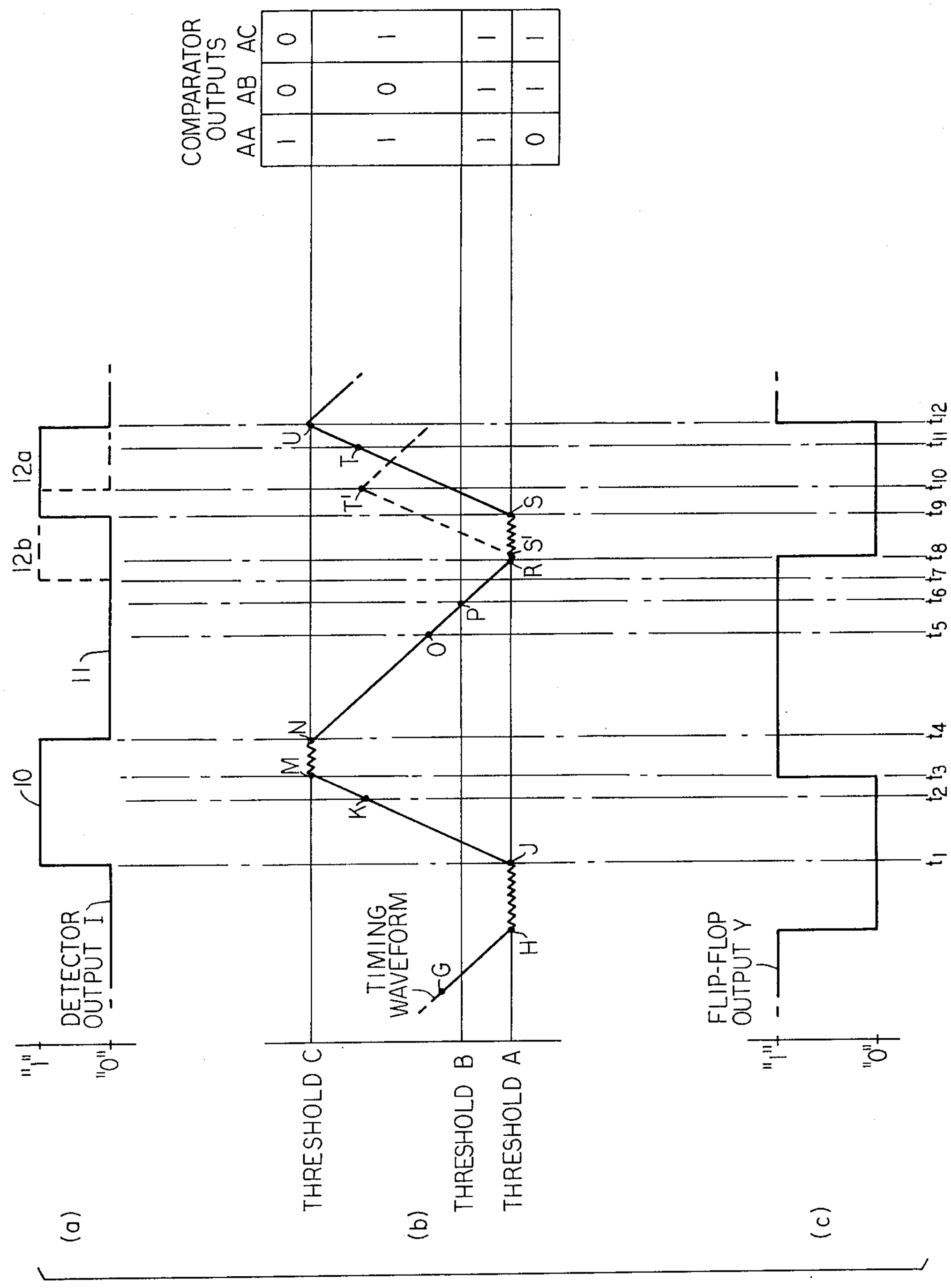
FIG. 2 shows graphs useful in describing the operation of the circuit of FIG. 1.

Reference is now made to FIG. 2. FIG. 2(a) shows a voltage vs. time graph of the detector 50 output signal I. Signal I corresponds to the pulse train applied to terminal 51 and has the logic value "1" during pulse periods of the pulse train and logic value "0" during interpulse periods.

FIG. 2(b) includes a voltage vs. time graph of the output signal of timing waveform generator 200, hereinafter referred to as "the timing waveform." Three values of ordinate, denoted thresholds A, B and C respectively, are indicated in FIG. 2(b). These voltage levels correspond to the values of comparison sources 322, 332 and 312 of comparators 320, 330 and 310. Thus, comparator output signals AA, AB and AC switch logic values when the timing waveform crosses thresholds A, B and C, respectively. To facilitate the following description, FIG. 2(b) also includes a chart indicating the logic values of each of the comparator output signals for each of the four regions of the FIG. 2(b) graph defined by thresholds A, B and C.

FIG. 2(c) shows a voltage vs. time graph of flip-flop 410 output signal Y.

The pulse checking circuit of FIG. 1 operates as follows. Assume that the circuit is in a quiescent state; that is, with no pulse train applied to input terminal 51. If the instantaneous value of the timing waveform is greater than threshold A such as indicated at point G in FIG. 2(b), then comparator output signal AA has the logic value "1." Since detector output signal I has the logic value "0," logic function L has the logic value "1" and, as previously described, the timing waveform is negative going.

When the timing waveform crosses threshold A at point H of FIG. 2(b), comparator signal AA switches to logic value "0." The negative transition thus generated at reset terminal 413 of flip-flop 410 transfers the flip-flop into its reset state. Flip-flop output signal Y thus takes on the logic value "0" as shown in FIG. 2(c). Accordingly, all three terms of the logic function L, and thus L itself, have the logic value "0" and the timing waveform becomes positive going until threshold A is recrossed. Thus, when no pulse train is presented for checking at input terminal 51, the timing waveform oscillates with a triangular waveform of very small (essentially zero) amplitude about threshold A. This is shown in FIG. 2(b) as the portion of the timing waveform between points H and J.

The first pulse of the train to be checked, corresponding to pulse 10 in FIG. 2(a), begins at time $t_1$. At that time, the logic value of detector output signal I changes from "0" to "1" as shown in FIG. 2(a). Accordingly, logic function L has the value "0" and the timing waveform becomes positive going beginning from point J in FIG. 2(b).

Certain circuit parameters of timing waveform generator 200, particularly capacitor 251, resitor 242 and the ratio of resistors 232 and 234, were mentioned above as determining the slope of the positive-going ramp generated thereby. These parameters, and the voltage difference between thresholds A and C (i.e., the voltage difference between comparison sources 322 and 312), are adjusted such that the time required for the timing waveform to go from threshold A to threshold C corresponds precisely to the specified minimum for the pulse period of the pulse train being checked.

Thus, if pulse 10 were to terminate (at a time $t_2$, for example) i.e., before the timing waveform beginning at point J reaches threshold C, this would indicate that the duration of pulse 10 was less than the specified minimum. Since detector output signal I would take on the logic value "0" at time $t_2$, the timing waveform would become negative going beginning at point K. If, however, as depicted in FIG. 2, pulse 10 meets the specified minimum, the timing waveform will reach threshold C at point M causing comparator output signal AC to switch to logic value "0." The negative transition thus generated at set terminal 412 of flip-flop 410 transfers the flip-flop from its reset to its set state. This is manifested in FIG. 2(c) by the switch at time $t_3$ of flip-flop output signal Y to logic value "1." At the same time, flip-flop output signal $\overline{Y}$ switches from logic value "1" to logic value "0" thereby triggering monostable multivibrator 430. The latter provides an output pulse at terminal 435, indicating that pulse 10 met the specified pulse period minimum. No interpulse or repetition period checks are made in conjunction with pulse 10.

Of course, if the duration of pulse 10 had not met the specified minimum so that, as described above, the positive-going timing waveform beginning from point J would not have reached threshold C, but would have become negative going from point K, no output pulse would have been generated by monostable multivibrator 430.

Thus, it is seen that gates 105, 110 and 150 in logic circuit 100, amplifiers 220 and 240 and their associated circuitries in timing waveform generator 200, comparators 310 and 320, and flip-flop 410 comprise an arrangement (referred to above as a "second timing circuit") which defines a time interval corresponding to the minimum specified for the pulse periods of the pulse train being checked.

Assume, that pulse 10 continues beyond the specified minimum, for example, until time $t_4$. Since signals I, AB and Y have the logic values "1," "0" and "1" respectively, the value of logic function L will be the opposite of comparator signal AC. Accordingly, the timing waveform will oscillate about threshold C (as long as pulse 10 continues) in substantially the same manner as it oscillates about threshold A when no pulse is present. This is shown in FIG. 2(b) as the portion of the timing waveform between points M and N.

When pulse 10 terminates at time $t_4$, timing of the first interpulse period 11 begins. Since detector output signal I has the logic value "0" while comparator output signal AA has the logic value "1," the value of logic function L becomes "1" and the timing waveform becomes negative going beginning from point N in FIG. 2(b).

As mentioned above, the slope of the negative- and positive-going ramps generated by timing waveform generator 200 may be independently adjusted. The latter is determined, for example, by the ratio of resistors 232 and 234 while the former is determined by their sum. Assuming thresholds A and C to have been previously fixed as described above, the slope of the negative-going ramp beginning, for example, from point N is chosen in conjunction with threshold B (i.e., the value of comparison source 332) such that (a) the time required for the negative-going ramp to go from threshold C to threshold B corresponds to the specified minimum for the interpulse period of the pulse train being checked and (b), the time required for the ramp to go from threshold B to threshold A corresponds to the supplementary interval associated with the specified minima, that is, the difference between the minimum pulse repetition period and the sum of the pulse and interpulse minima.

Since the sum of the supplementary interval and the specified pulse and interpulse minima is equal to the repetition period minimum, the minimum time in which the timing waveform can go from threshold C to threshold A and back is also equal to the repetition period minimum. The significance of this will be apparent as this description continues.

In accordance with the above discussion, it is seen that if the duration of interpulse period 11 where less than the specified minimum, terminating for example at time $t_5$, the timing waveform beginning at point N would become positive going from point O. If, however, as depicted in FIG. 2, interpulse period 11 meets the specified minimum, the timing waveform will cross threshold B at point P corresponding to time $t_6$. Comparator output signal AB thus switches to logic value "1." Since the logic value of flip-flop output signal Y is also "1," logic function L will remain at that value until the timing waveform crosses threshold A, notwithstanding initiation of a pulse period in the interim, for example, at time $t_7$. Thus, once the timing waveform crosses threshold B, it will continue to be negative going until it reaches threshold A, thereby timing the supplementary interval.

Thus, it is seen that logic circuit 100, amplifiers 220 and 240 and their associated circuitries in timing waveform generator 200, comparators 310, 320 and 330, and flip-flop 410 comprise an arrangement (referred to above as a "first timing circuit") which defines timing intervals respectively corresponding to the minimum specified for the interpulse periods of the pulse train being checked, and to the supplementary period associated with the specified pulse train minima.

When, ultimately, threshold A is crossed at point R, the logic value of comparator AA switches from "1" to "0" and as shown in FIG. 2(c), flip-flop output Y again takes on the logic value "0." This indicates that interpulse period 11 met the required minimum.

Initiation of the pulse following interpulse period 11 may occur, for example, at a time $t_9$, i.e., after the timing waveform has reached point R. This pulse is indicated as pulse 12*a* in FIG. 2(a). Between the time $t_8$ when point R is reached, and time $t_9$, the timing waveform oscillates about threshold A, shown in FIG. 2(b) as the portion thereof between points R and S.

When pulse 12*a* begins at time $t_9$, the timing waveform becomes positive going from point S. If the duration of pulse 12*a* were to be less than the specified minimum, so that the pulse would terminate at a time such as time $t_{11}$, the timing waveform would become negative going at point T. However, if, as depicted in FIG. 2, the pulse period minimum is met, the timing waveform crosses threshold C at point U. Illustratively, the duration of pulse 12*a*, which ends at time $t_{12}$, is precisely equal to the specified pulse period minimum. Accordingly, the timing waveform becomes negative going almost immediately after crossing threshold C.

Since, as previously mentioned, the minimum time in which the timing waveform can go from threshold C to threshold A and back corresponds to the specified repetition period minimum, the crossing of threshold C at point U by the timing waveform indicates that this criterion has been met. That is, the interval between $t_4$ and $t_{12}$ is at least as great as the repetition period minimum. In addition, the crossing of threshold C at point U also indicates that the duration of pulse 12*a* met the minimum specified therefor, since the time required for the timing waveform to go from threshold A to threshold C corresponds to that minimum. Moreover, a negative transition will be induced at flip-flop output terminal 414 in response to the crossing of threshold C only if the flip-flop was previously transferred to its reset state as an indication that interpulse period 11 also met the minimum specified therefor.

Thus, the output pulse generated at terminal 435 by monostable multivibrator 430 in response to the negative transition at terminal 414 is an indication that all three timing minima associated with the interval between time $t_4$ and time $t_{12}$ have been met.

Although pulse 12*a* begins after time $t_8$, that is, after the timing waveform has crossed threshold A at point R, the pulse which follows interpulse period 11 may begin during the timing of the supplementary interval, that is, at a time precedent to time $t_8$ such as time $t_7$. Such a pulse 12*b* is indicated by dashed lines in FIG. 2(a). As indicated by dashed lines in FIG. 2(b), the timing waveform generated in response to pulse 12*b* becomes positive-going from point S', i.e., virtually immediately after the timing waveform reaches threshold A. Illustratively, the duration of pulse 12*b*, which terminates at time $t_{10}$, is the same as that of pulse 12*a*.

However, here, the timing waveform beginning from point S' does not reach threshold C because even though both interpulse period 11 and pulse period 12*b* meet the minima specified therefor, the duration of the interval from time $t_4$ to time $t_{10}$, i.e., the repetition period associated therewith is less than the repetition period minimum. Rather, the timing waveform becomes negative-going from point T'. Accordingly, no output pulse is generated at terminal 435, thereby indicating that the least one of the timing criteria (in this case the repetition period) has not been met.

Since the timing waveform becomes negative-going from point T' upon termination at time $t_{10}$ of pulse 12*b*, it is possible for the timing waveform to thereafter reach threshold B before the interpulse period following pulse 12*b* ends, thereby erroneously indicating that that interpulse period minimum was met. Thus, in general, the circuit of FIG. 1 will reliably indicate for a given pulse train only one instance of non-attainment of one of the specified pulse train minima. While this may be disadvantageous in certain applications, in others it is not.

For example, a pulse checking circuit in accordance with the present invention may be advantageously connected in a telephone central office and accessed by a telephone installer via a designated telephone number to check the operation of a newly installed telephone set such as an automatic multifrequency dialer. These dialers generate a train of multifrequency tone bursts (each of which may be regarded as a pulse) to represent the digits of a telephone number, which digits may be stored, for example, on a punched card or in an internal memory. A train of test pulses is sent. Circuitry (not shown in FIG. 1) responsive to both the incoming pulse train and the output pulses at terminal 435, will return to the installer a first signal if all timing minima of the pulse train were met (as indicated, for example, by an equivalence of the number of input and output pulses). It will return a second signal if at least one timing minimum was not met. The latter signal indicates that some corrective action should be taken, for example, replacement of the automatic dialer, or recalibration and retesting thereof. Thus, in this application, it is only necessary to know that one timing minimum was not met and the failure of the test circuit to indicate that more than one timing minimum were not met is not of consequence.

Attention is now redirected to timing waveform generator 200. As noted above, the slopes of both the positive- and negative-going ramps generated thereby are determined either directly or after amplification by the voltage across diode 237. Thus, a change in that voltage, caused, for example, by a change in ambient temperature, by fluctuations in source 236 or by aging or replacement of diode 237 will alter the internal standards against which the circuit of FIG. 1 checks the pulse train minima. Since the slopes of the ramps provided by generator 200 are lineraly proportionaly to the voltage across diode 237, this problem may be avoided in accordance with one aspect of the invention by deriving at least two of the three comparison sources 312, 322 and 332 from the diode 237 voltage. In this way the change in slope can be precisely compensated for by proportionate adjustment of the voltage differences among thresholds A, B and C.

Accordingly, FIG. 3 shows an arrangement for deriving comparison voltages for comparators 310, 320 and 330 from the voltage across diode 237. FIG. 3 includes operational amplifier 510, feedback resistor 513 and an output voltage divider comprising serially-connected resistors 517 and 518, which voltage divider connects output terminal 521 of amplifier 510 to ground. The anode voltage of diode 237 is extended to the noninverting input terminal of amplifier 510 via resistor 512.

The desired value for sources 312 and 332 (thresholds C and B respectively) are realized by adjusting resistor 512 and/or resistor 513 for the former, and resistor 517 and/or resistor 518 for the latter. Illustratively, the magnitude of source 322 (threshold A) is zero, i.e., ground potential, although it, too, may also be derived, for example, from a voltage divider off of terminal 521.

Thus, the circuit of FIG. 1, utilized in conjunction with that of FIG. 3, provides an arrangement for precisely checking pulse, interpulse and repetition periods in pulse trains, which arrangement is insensitive to changes in ambient temperature, fluctuation of power supply voltages and aging of component values.

It will be appreciated that the circuits of FIGS. 1 and 3 are merely illustrative of the principles of the invention. The circuit of FIG. 1 may be modified for calibration purposes, for example, by disconnecting detector 50 from lead 104 and then connecting flip-flop output terminal 414 thereto. The timing waveform will then automatically oscillate between thresholds A and C. The calibration of the checking circuit as to repetition and pulse period minima can then be verified by monitoring, for example, the flip-flop output signal Y, and its calibration as to interpulse period minimum can be verified by monitoring the NOR function of flip-flop output signal $\overline{Y}$ and comparator output signal AB.

It is to be understood, therefore, that further modifications and embodiments of the invention may be devised by those skilled in the art without departing from the spirit and scope thereof.

I claim:

1. A circuit for checking that the repetition period and the interpulse and pulse periods of a pulse train each exceed respective specified minima comprising, first timing means for providing an indication if said interpulse period satisfies the minimum specified therefor, and second timing means operative during said pulse period for timing a predetermined interval corresponding to the specified pulse period minimum, said first timing means including means operative in response to said indication for inhibiting the operation of said second timing means for an interval corresponding to the supplementary interval associated with said minima, said second timing means providing an output signal only if timing of said predetermined interval is completed during said pulse period, said output signal indicating that each of said specified minima has been met.

2. A circuit in accordance with claim 1 wherein said first timing means includes means for generating first and second timing waveform segments the durations of which respectively correspond to said interpulse period and said supplementary interval, and wherein said second timing means includes means for generating a timing waveform having a duration corresponding to said pulse period minimum.

3. A circuit for checking that the repetition period and the interpulse and pulse periods of a pulse train each exceed specified minima comprising, first means operative in response to the initiation of said interpulse period for generating a first timing signal having first and second sequential segments, the duration of said first and second segments respectively corresponding to the minimum specified for said interpulse period and the supplementary interval associated with said specified minima, said first means including means operative during the generation of said first segment for terminating said first timing signal in response to the termination of said interpulse period, and second means operative during said pulse period for generating a second timing signal responsive to the completion of said second segment, said second timing signal having a duration corresponding to the minimum specified for said pulse period, whereby termination of said pulse period subsequent to completion of the second timing signal indicates that each of said specified minima has been met.

4. A circuit in accordance with claim 3 wherein one of said first and second timing signals is a positive-going waveform and the other is a negative-going waveform, and wherein the initial value of each of said waveforms corresponds to the terminal value of the other.

5. A circuit in accordance with claim 3 wherein at least one of said first and second timing signals is a ramp and wherein at least one of said first and second means includes a ramp generator comprising a reference signal source and means for integrating the reference signal therefrom to generate said ramp.

6. A circuit in accordance with claim 5 wherein said first and second timing signals are first and second ramps, respectively, and wherein said first and second means collectively include said ramp generator, the latter further comprising means operative in conjunction with one of said first and second means for amplifying and inverting said reference signal, whereby one of said ramps has a positive slope of a first magnitude and the other of said ramps has a negative slope of a second magnitude.

7. A circuit in accordance with claim 5 wherein said one of said first and second means further comprises a plurality of comparator means including a plurality of comparison sources which sources define respective initial and final values for said ramp and wherein said first means further comprises comparator means including a comparison source which defines an intermediate value demarcating said first and second segments of said first timing signal.

8. A circuit in accordance with claim 7 wherein at least two of said comparison sources are derived from said reference signal.

9. A circuit in accordance with claim 7 wherein said first and second timing signals are first and second ramps respectively and wherein said first and second means collectively include said ramp generator, the latter further comprising means operative in conjunction with one of said first and second means for amplifying and inverting said reference signal such that one of said ramps has a positive slope and the other a negative slope with the initial value of each of said ramps corresponding to the terminal value of the other.

10. A circuit in accordance with claim 9 wherein said second means includes means operative for terminating said second timing signal in response to the termination of said pulse period, and output means for indicating completion of said second timing signal.

11. A circuit for checking a pulse train comprising, means for generating a timing waveform, said generating means including means responsive to a logic signal having first and second logic values for providing said timing waveform with a negative slope in response to said first logic value and a positive slope in response to said second logic value, bistable means, said bistable means switching from a second state to a first state when said timing waveform has a positive slope and crosses a predetermined upper threshold and switching from said first state to said second state when said timing waveform has a negative slope and crosses a predetermined lower threshold, circuit means normally providing said input signal at said second logic value and operative for providing said input signal at said first logic value, first means for operating said circuit means when said timing waveform is greater than said lower threshold during interpulse periods of said pulse train, second means for operating said circuit means when said bistable means is in said first state and said timing waveform is greater than said upper threshold, and third means for operating said circuit means when said bistable means is in said first state and said timing waveform is less than a predetermined threshold intermediate said upper and said lower thresholds.

12. A pulse train checking circuit in accordance with claim 11 wherein said generating means includes a source of a reference signal, means for integrating said reference signal, and means operative in response to one of said first and second logic values for amplifying and inverting said reference signal prior to integration thereof.

13. A pulse train checking circuit in accordance with claim 11 wherein said first, second and third means respectively include first, second and third comparators for respectively indicating whether said timing waveform is greater than or less than said lower, upper and intermediate thresholds, respectively.

14. A pulse train checking circuit in accordance with claim 13 wherein the comparison levels for at least two of said first, second and third comparators are derived from said reference signal.

15. A pulse train checking circuit in accordance with claim 14 wherein said reference signal source comprises a forward-biased diode, said reference signal comprising the voltage across said diode.

References Cited

UNITED STATES PATENTS 3,243,526 3/1966 La Barge et al. ---- 179—175.2 A

KATHLEEN H. CLAFFY, Primary Examiner

D. W. OLMS, Assistant Examiner

U.S. Cl. X.R.

178—69 A